US011999483B2

United States Patent
Bystroem et al.

(10) Patent No.: US 11,999,483 B2
(45) Date of Patent: Jun. 4, 2024

(54) PAYLOAD LAUNCHING ARRANGEMENT AND A METHOD FOR LAUNCHING A PAYLOAD

(71) Applicant: SAAB AB, Linkoeping (SE)

(72) Inventors: Gunnar Bystroem, Kungsaengen (SE); Fredrik Gustafsson, Taeby (SE)

(73) Assignee: SAAB AB, Linköping (SE)

( * ) Notice: Subject to any disclaimer, the term of this patent is extended or adjusted under 35 U.S.C. 154(b) by 244 days.

(21) Appl. No.: 17/250,527

(22) PCT Filed: Aug. 14, 2018

(86) PCT No.: PCT/SE2018/050823
§ 371 (c)(1),
(2) Date: Feb. 1, 2021

(87) PCT Pub. No.: WO2020/036519
PCT Pub. Date: Feb. 20, 2020

(65) Prior Publication Data
US 2021/0316860 A1    Oct. 14, 2021

(51) Int. Cl.
*B64D 1/12* (2006.01)
*F42B 5/15* (2006.01)

(52) U.S. Cl.
CPC . *B64D 1/12* (2013.01); *F42B 5/15* (2013.01)

(58) Field of Classification Search
CPC ..... B64D 1/12; B64D 1/02; F42B 5/15; F41F 7/00; F41H 11/02; G01S 7/38
See application file for complete search history.

(56) References Cited

U.S. PATENT DOCUMENTS

| | | | | |
|---|---|---|---|---|
| 3,459,099 A | * | 8/1969 | Litz, Jr. ............. | B64D 1/02 89/1.51 |
| 3,511,457 A | * | 5/1970 | Pogue ............. | B64D 1/02 89/1.51 |

(Continued)

FOREIGN PATENT DOCUMENTS

| GB | 578297 A | 6/1946 |
|---|---|---|
| WO | WO 2009/145687 A1 | 12/2009 |
| WO | WO 2010/123424 A1 | 10/2010 |

OTHER PUBLICATIONS

International Searching Authority (ISA), International Search Report and Written Opinion received for International Application No. PCT/SE2018/050823, Apr. 8, 2019, 11 pages, Swedish Patent and Registration Office, Sweden.

(Continued)

*Primary Examiner* — Medhat Badawi
(74) *Attorney, Agent, or Firm* — Alston & Bird LLP (57) ABSTRACT

The present invention concerns an arrangement (1) configured for storing and launching a payload (3) and a method for launching the payload (3) from the arrangement (1). A body (9) of the arrangement (1) comprises a compartment (15) configured to store and eject the payload (3). An aerodynamic surface (11) of the body (9) is provided with a launch opening (13) comprising a guideway (17) extending from the compartment (15). A sliding portion (12) of the payload (3) is configured to slide along the guideway (17) and through the launch opening (13) upon ejection. The extension of the guideway (17) inclines with an acute angle ($\alpha$) relative the normal (N) to the centre line (CL) of the elongated body (9).

9 Claims, 3 Drawing Sheets

(56) References Cited

U.S. PATENT DOCUMENTS

| | | | | |
|---|---|---|---|---|
| 3,517,584 A * | 6/1970 | Robinson | | B64D 1/02 89/1.51 |
| 4,134,115 A * | 1/1979 | Strom | | F42B 12/70 221/88 |
| 4,421,007 A * | 12/1983 | Hanes, Jr. | | B64D 7/00 89/1.11 |
| 4,679,483 A * | 7/1987 | Wrana | | B64D 1/16 89/1.51 |
| 4,696,442 A * | 9/1987 | Mazzitelli | | B64C 23/06 244/200.1 |
| 5,090,642 A * | 2/1992 | Salkeld | | B64C 3/14 244/171.3 |
| 5,271,523 A * | 12/1993 | Nasvall | | B64D 1/02 221/199 |
| 6,619,178 B1 * | 9/2003 | Fransson | | B64D 1/02 89/1.51 |
| 6,666,351 B1 * | 12/2003 | Hartz | | F41H 11/02 102/342 |
| 7,614,334 B2 * | 11/2009 | Bellino | | F42B 12/70 89/1.51 |
| 7,866,246 B2 * | 1/2011 | Bellino | | F41H 11/02 89/1.51 |
| 8,485,467 B2 * | 7/2013 | Gemma | | F41H 11/02 244/121 |
| 8,490,924 B2 * | 7/2013 | Zachrisson | | F41F 7/00 89/1.51 |
| 8,549,976 B2 * | 10/2013 | Zatterqvist | | B64D 7/00 89/1.51 |
| 8,607,682 B2 * | 12/2013 | Zatterqvist | | B64D 7/08 89/1.51 |
| 8,695,847 B2 * | 4/2014 | Sjobeck | | F41F 7/00 102/505 |
| 8,720,829 B2 * | 5/2014 | Zatterqvist | | F41J 2/02 89/1.51 |
| 9,523,560 B2 * | 12/2016 | Rafin | | F41H 11/02 |
| 9,795,812 B2 * | 10/2017 | Charlton | | F42B 12/50 |
| 9,851,183 B2 * | 12/2017 | Melin | | F41H 11/02 |
| 10,330,449 B2 * | 6/2019 | Fix | | F42B 12/70 |
| 10,486,813 B2 * | 11/2019 | Zaetterqvist | | F41F 3/077 |
| 10,871,348 B2 * | 12/2020 | Zätterqvist | | B64D 7/00 |
| 11,053,007 B1 * | 7/2021 | Mills | | F42B 4/26 |
| 2009/0120955 A1 * | 5/2009 | Friede | | F41F 7/00 221/282 |
| 2012/0012605 A1 * | 1/2012 | Melin | | F41H 11/02 221/87 |
| 2012/0012608 A1 * | 1/2012 | Sjobeck | | B64D 1/02 221/246 |
| 2012/0104174 A1 * | 5/2012 | Zatterqvist | | F41J 2/02 221/133 |
| 2012/0125183 A1 * | 5/2012 | Zatterqvist | | F42B 12/70 89/1.51 |
| 2021/0261254 A1 * | 8/2021 | Bystroem | | B64D 1/02 |
| 2021/0316860 A1 * | 10/2021 | Bystroem | | F41F 7/00 |

OTHER PUBLICATIONS

International Preliminary Examining Authority, International Preliminary Report on Patentability, Chapter II, including Applicant's Jun. 3, 2020 response to the ISA's Apr. 8, 2019 Written Opinion, received for International Application No. PCT/SE2018/050823, Jun. 9, 2020, 14 pages, Swedish Patent and Registration Office, Sweden.

European Patent Office, Extended European Search Report received for Application No. 18930287.0, dated Feb. 14, 2022, 7 pages, Germany.

* cited by examiner

FIG. 8b

PAYLOAD LAUNCHING ARRANGEMENT AND A METHOD FOR LAUNCHING A PAYLOAD

CROSS REFERENCE TO RELATED APPLICATIONS

This application is a National Stage Application, filed under 35 U.S.C. § 371, of International Application No. PCT/SE2018/050823, filed Aug. 14, 2018; the contents of which is hereby incorporated by reference in its entirety.

BACKGROUND

Related Field

The present invention relates to an arrangement configured for storing and launching a payload, the arrangement comprises an elongated body comprising a compartment configured to store and eject the payload, an aerodynamic surface of the elongated body is provided with a launch opening comprising a guideway extending from the compartment, a flat side of the payload is configured to slide along the guideway and through the launch opening upon ejection.

The present invention especially relates to an arrangement for storing and launching countermeasures from aerial vehicles to deter and defeat threats.

The present invention may concern the industry manufacturing arrangements configured to store and launch payloads from aerial vehicles, but is not limited to such.

DESCRIPTION OF RELATED ART

Side-ways eject arrangements of today configured for storing and launching payload suffer from not being capable to launch the payload in a secure way, wherein the payload might get jammed in the launch opening.

One problem with current side-ways eject arrangements may be that payloads configured to be openable for realising countermeasure means might not start a backward backflip when launched One problem with side-ways eject arrangements of today is that they provide a poor bloom rate, i.e. poor spread out of countermeasure means, whereas they suffer from poor launch efficiency and slow sideway ejection of the payload.

There is an object to provide an arrangement configured for storing and launching a payload, wherein the payload to be launched is ejected in such way that efficient sideway launch can be performed without any risk for jammed payload in the launch opening.

One object is to provide an arrangement configured for storing and launching a payload configured for aerial vehicles and countermeasure protection of the aerial vehicle by sideway ejection of payload.

One object is to overcome problems with prior art arrangements configured for storing and launching payloads.

This has been solved by an arrangement configured for storing and launching an payload, the arrangement comprises a body comprising a compartment configured to store and eject the payload, an aerodynamic surface of the body is provided with a launch opening comprising a guideway extending from the compartment, a sliding portion of the payload is configured to slide along the guideway and through the launch opening upon ejection, wherein the extension of the guideway inclines with an acute angle relative the normal to the centre line of the body.

Alternatively, the guideway of the launch opening is coupled to or associated with a payload holding area of an end section of the compartment, which payload holding area is configured to hold the payload to be launched in an eject position in the compartment.

Alternatively, the payload holding area is configured with an ejection mechanism configured to eject the payload along the payload holding area in a direction toward the launch opening.

Alternatively, the payload holding area exhibits an extension extending transverse or substantially transverse to the centre line.

Alternatively, the plane of the payload holding area and the plane of the guideway exhibit a relative angle corresponding to the acute angle, which relative angle forms a corner point.

Alternatively, the acute angle is determined such that, during use of the arrangement, airflow flowing over the aerodynamic surface will apply an additional force on a first portion of the payload being ejected, which first portion firstly leaves the payload holding area, thereby rotating the payload over the corner point formed by the payload holding area and the guideway.

Alternatively, the acute angle is determined such that, during use of the arrangement, airflow flowing over the aerodynamic surface will apply an additional force on a first portion of the payload being ejected, so that the payload will flip around for releasing a countermeasure element by means of the airflow.

Alternatively, a second portion of the payload being exposed to the airflow after that the first portion has been exposed to the airflow so that the payload will perform a backflip for exposing the sliding portion to the airflow.

The corner point may be defined as a section in which the extension of the payload holding area and the guideway meet.

The corner point may be called vertex or bending point.

The corner point may be curved or divided in sections or sharp bent.

The ejection mechanism may be configured to eject the payload along the payload holding area providing a motion of the payload over the corner point assuring that the first portion is exposed to the airflow before the second portion is exposed.

The second portion may be exposed to the airflow, but with less force than the additional force.

In such way the ejected payload will be affected by an additional force generated by the airflow forcing the payload along the guideway providing that a rapid sideway ejection of the payload is achieved.

Alternatively, the body exhibits a fore end and an aft end seen in a direction along the flight direction.

Alternatively, the body is an elongated body extending in the flight direction when used.

Alternatively, during use of the arrangement, a first direction pointing from the aft end to the fore end fully or essentially corresponds with the flight direction of an aerial vehicle coupled to the arrangement.

Alternatively, during use of the arrangement, a second direction pointing from the fore end to the aft end fully or essentially corresponds with the direction of an airflow flowing over the aerodynamic surface.

Alternatively, the guideway inclines obliquely downwards and backwards relative to the flight direction.

Alternatively, all payloads stored in the compartment are configured to be launched one by one through the launch opening.

In such way sideways launching of the payloads is efficient and simplified.

Alternatively, the sliding portion of the payload is formed flat, or essentially flat.

The centre line is defined as a line that runs along the prolongation of the elongated body and between the fore end and the aft end. The interior of the acute angle faces away from the centre line. The interior of the acute angle is defined as an area displayed between the normal (normal line) and an imaginary inclining line congruent (or parallel) with the guideway.

Alternatively, the imaginary inclining line is defined as to start from the centre line and points away from the centre line in a direction inclining toward the aft end.

Since the imaginary inclining line of the guideway is arranged to incline toward the aft end and thus inclines "with" the airflow and not inclines "against" the airflow, the airflow will apply an additional force on a first portion of the payload being ejected, which additional force assists and supports the ejection of the payload.

Alternatively, the payload may be an openable payload comprising a box-like container, which is configured to open for releasing countermeasure means from the box-like container.

In such way the ejected payload will be affected by an additional force generated by the airflow providing that a rapid sideway ejection of the payload is achieved.

The first portion primarily exposed surface of the payload may be defined as a first face surface of the payload, which first portion primarily being exposed to the airflow, when the payload being ejected from the elongated body.

Alternatively, the payload comprises a sliding portion.

Alternatively, the sliding portion is opposite the first and second portion.

Alternatively, the sliding portion is configured to slide along the guideway toward the opening.

Alternatively, the sliding portion is configured to open and release a countermeasure contained in a box-like container of the payload when the payload has made the backflip and the sliding portion thus faces the airflow.

Alternatively, the sliding portion comprises an orifice that is formed with a less area that an abutment area of the countermeasure, which abutment area is configured to abut an inner side of the sliding portion, but formed with such sufficient area that airflow after said backflip is permitted to press out the countermeasure from the box-like container.

Alternatively, the sliding portion is opposite an opposite side of the payload comprising the first and second portion.

Alternatively, the first portion comprises a firstly the airflow exposing first surface.

Alternatively, the second portion comprises a secondly the airflow exposing second surface.

Alternatively, the sliding portion comprises a sliding surface configured to slide on the guideway.

Alternatively, the gradient of the direction of an airflow flowing over the aerodynamic surface, during use of the arrangement, with respect to an imaginary inclining line parallel with the guideway exhibits an obtuse angle defined externally the launch opening in a direction toward a fore end of the arrangement and seen in a direction outward from the aerodynamic surface.

In such way arrangement can be efficiently used by an aerial vehicle flying with a high angle of attack and flying slow.

Alternatively, the extension of the guideway extends a distance outward from and beyond the major part of the aerodynamic surface.

In such a way is achieved that the payload will leave the elongated body (the major part of the elongated body) further away from the aerodynamic surface implying that the payload is ejected further sideways.

In such way is achieved an increased bloom rate when ejecting a plurality of payloads from the elongated body.

Alternatively, the acute angle is between 10° to 60°, preferably between 20° and 45°.

Alternatively, the arrangement is carried by an aerial vehicle configured to carry the arrangement according to any of the enclosed claims.

Alternatively, the arrangement is configured to launch the payload sideways from the aerial vehicle.

Alternatively, the arrangement comprises one payload or a plurality of payloads configured to be launched from the arrangement.

Alternatively, the arrangement may comprise a plurality of payloads, each configured to be ejected from the compartment.

Alternatively, the payload may comprise a countermeasure means which is releasable arranged to the payload and released for confusing e.g. radar-guided or infrared guided anti-aircraft missiles.

Alternatively, the payload may constitute the countermeasure means per se.

Alternatively, the countermeasure means may comprise flares or chaff or infrared countermeasures or other countermeasure.

Alternatively, an imaginary inclining line of the guideway may define the inclination of the guideway, wherein the inclining line inclines toward the aft end of the elongated body and thus inclines "with" the airflow.

This has been solved by a method for launching an payload from an arrangement comprises an elongated body comprising a compartment configured to store and eject the payload, an aerodynamic surface of the elongated body is provided with a launch opening comprising a guideway extending from the compartment, a sliding portion of the payload is configured to slide along the guideway and through the launch opening upon ejection, the extension of the guideway inclines with an acute angle relative the normal to the centre line of the elongated body; the method comprises the steps of; positioning the payload to be launched in an eject position; ejecting the payload along the extension of the guideway; exposing the payload to an airflow flowing over the aerodynamic surface; and releasing a countermeasure means from the payload by means of the airflow.

Alternatively, the method comprises the further steps of: exposing a first portion of the payload to the airflow; exposing a second portion of the payload to the airflow, the second portion being exposed after that the first portion has been exposed so that the payload will perform a backflip exposing the sliding portion to the airflow.

In such way there is achieved a moment of inertia and rotation energy providing that the payload will make a backflip.

Alternatively, the method comprises the step of; ejecting the payload along the extension of the guideway extending beyond the aerodynamic surface.

Alternatively, the method comprises the step of; ejecting the payload along the extension of the guideway, wherein the extension of the guideway inclines with an acute angle relative the normal to the centre line of the elongated body, the acute angle is between 10° to 60°, preferably between 20° and 45°.

Due to the inclination and interaction with the air flow, the payload is affected by an eject force (additional force) pushing the payload out from the launch opening. This additional force is thus generated by the air flow in cooperation with the inclination.

In such way is achieved that the performance of the ejection mechanism configured to eject the payload along the guideway can be enhanced, wherein the payload can be launched even more a further distance sideways from the aerial vehicle.

The aerial vehicle may be a commercial aircraft or a military aircraft.

The arrangement configured for storing and launching a payload may be called a countermeasure arrangement and/or a side-ways eject arrangement.

BRIEF DESCRIPTION OF THE FIGURES

The present disclosure herein will now be described by way of examples with references to the accompanying schematic drawings, of which.

DETAILED DESCRIPTION OF VARIOUS EMBODIMENTS

Hereinafter, examples of the present invention will be described in detail with reference to the accompanying drawings, wherein for the sake of clarity and understanding of the invention some details of no importance may be deleted from the drawings.

Figure 1:
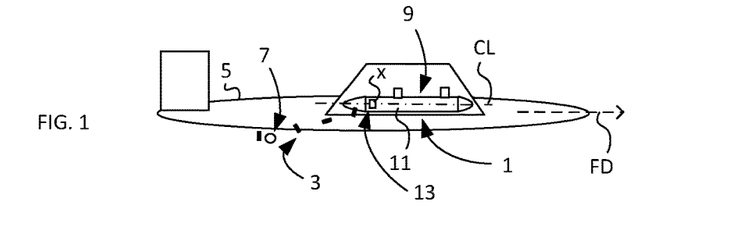
FIG. 1 illustrates an arrangement configured for storing and launching a payload according to a first example.

FIG. 1 illustrates an arrangement configured for storing and launching a payload according to a first example.

An arrangement 1 configured for storing and launching a payload 3 is carried by an aircraft 5. The arrangement 1 may be configured to store a plurality of payloads 3 comprising countermeasure means 7 adapted to be released from the payload 3. The arrangement 1 comprises an elongated body 9 comprising a compartment (not shown) provided to store and eject the payload 3. An aerodynamic surface 11 of the elongated body 9 is provided with a launch opening 13 comprising a guideway (not shown) extending from the compartment. A sliding portion (see e.g. FIG. 2c and reference 12) of the payload 3 is configured to slide along the guideway and through the launch opening 13 upon ejection. The extension of the guideway inclines with an acute angle relative the normal to the centre line CL of the elongated body. The aircraft 5 moves through the air along its flight direction FD.

Figure 2A:
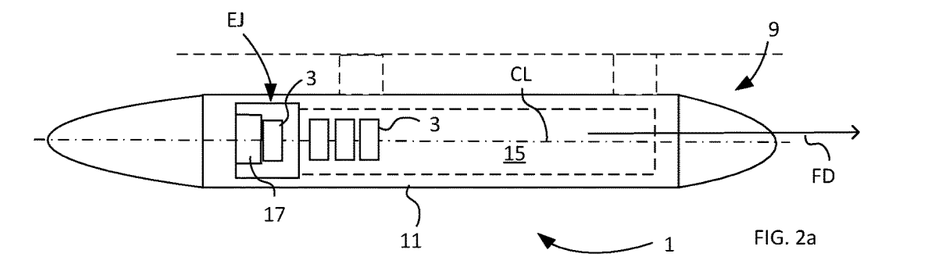
FIGS. 2a-2c illustrate an arrangement configured for storing and launching a payload according to a second example.
Figure 2B:
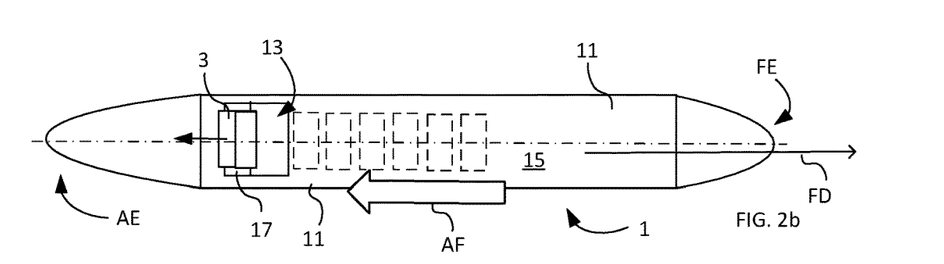
Figure 2C:
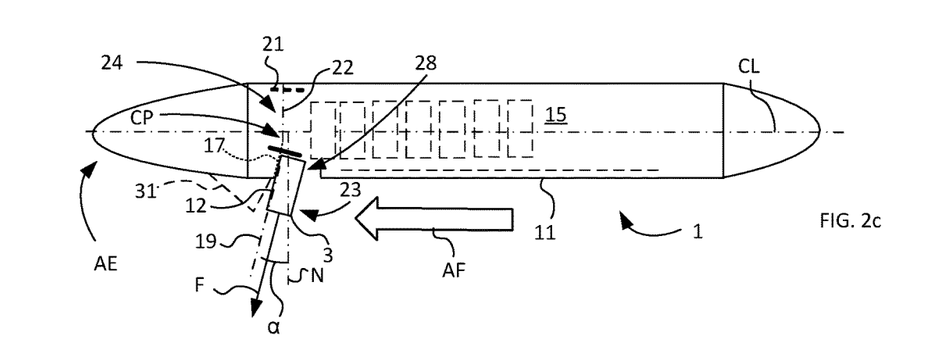

FIGS. 2a-2c illustrate an arrangement 1 configured for storing and launching a payload 3 according to a second example. FIG. 2a illustrates the arrangement 1 in a side view. The arrangement 1 comprises an elongated body 9 comprising a compartment 15 provided to store and eject the payloads 3 one by one. The payload 3 to be ejected is positioned into an eject position EJ by means of a positioning device (not shown). FIG. 2b illustrates that an ejection mechanism (not shown) ejects the positioned payload 3. A sliding portion 12 of the payload 3 is configured to slide along a guideway 17 and through the launch opening 13 upon ejection. The extension of the guideway inclines with an acute angle α (see FIG. 2c) relative the normal N to the centre line CL of the elongated body 9. The acute angle α may be between 10° to 60°, preferably between 20° and 45°.

The arrangement 1 as shown in FIG. 2c is moved through the air along a flight direction FD, wherein the air flows over the aerodynamic surface 11 as an airflow AF. The payload 3 being ejected will be affected by an additional force generated by the airflow AF providing that a rapid sideway ejection of the payload 3 is achieved. A direction pointing from the fore end FE to the aft end AE fully or essentially corresponds with the direction of an airflow AF flowing over the aerodynamic surface 11. FIG. 2c illustrates the arrangement 1 from above.

An imaginary inclining line 19 of the guideway 17 defines the inclination of the guideway 17, wherein the inclining line inclines toward the aft end AE and thus inclines "with" the airflow AF. The airflow AF will apply an additional force on a first portion of the payload 3 being ejected, which additional force assists and supports the ejection of the payload 3 further sideways. In such way the ejected payload will be affected by an additional force F generated by the airflow AF providing that a rapid sideway ejection of the payload 3 is achieved.

The guideway 17 of the launch opening 13 may be coupled to or associated with a payload holding area 22 of an end section 24 of the compartment 15, which payload holding area 22 is configured to hold the payload 3 to be launched in the eject position EJ in the compartment 15. The payload holding area 22 may be configured with an ejection mechanism 21 configured to eject the payload 3 along the payload holding area 22 in a direction toward the launch opening 13. The payload holding area 22 exhibits an extension extending transverse or substantially transverse to the centre line CL. The plane of the payload holding area 22 and the plane of the guideway 17 exhibit a relative angle corresponding to the acute angle α, which relative angle forms a corner point CP. The acute angle α may be determined such that, during use of the arrangement 1, airflow AF flowing over the aerodynamic surface 11 will apply an additional force on a first portion 23 of the payload 3 being ejected, which first portion 23 firstly leaves the payload holding area 22, thereby rotating the payload 3 over the corner point CP formed by the payload holding area 22 and the guideway 17. The acute angle α may be determined such that, during use of the arrangement 1, airflow AF flowing over the aerodynamic surface 11 will apply the additional force F on a first portion 23 of the payload 3 being ejected, so that the payload 3 will flip around for releasing a countermeasure element (not shown) by means of the airflow AF. A second portion 28 of the payload 3 may be exposed to the airflow AF after that the first portion 23 has been exposed to the airflow AF so that the payload 3 will perform a backflip (see FIG. 4) for exposing the sliding portion 12 to the airflow AF. The corner point CP may be defined as a section in which the extension of the payload holding area 22 and the guideway 17 meet. The ejection mechanism 21 configured to eject the payload 3 along the payload holding area 22 providing a motion of the payload 3 over the corner point assures that the first portion 23 is exposed to the airflow AF before the second portion 28 is exposed. The second portion 28 may be exposed to the airflow, but with less force than the additional force F.

As an example of the arrangement 1 there is shown that the extension of the guideway 17 may extend a distance outward from and beyond the major part of the aerodynamic surface 11 of the elongated body 9 by means of an extension 31 (shown with broken line). In such a way is achieved that the payload 3 will leave the elongated body 9 (the major part of the elongated body) further away from the aerodynamic surface 11 implying that the payload 3 can be ejected even further sideways from the elongated body 9. The extended guideway of the extension 31 may exhibit a different inclination than that of the guideway 17.

Figure 3:
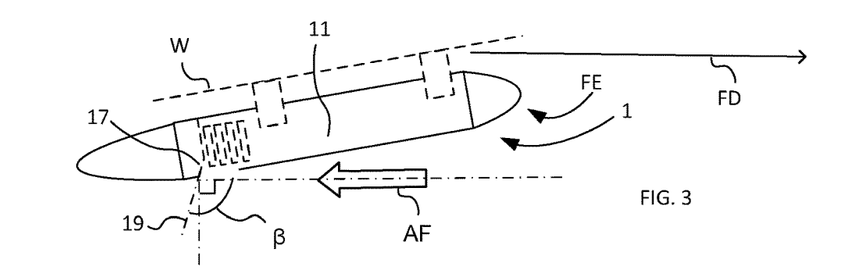
FIG. 3 illustrates an arrangement configured for storing and launching a payload according to a third example.

FIG. 3 illustrates an arrangement 1 configured for storing and launching a payload according to a third example. The gradient of the direction of an airflow AF flowing over the aerodynamic surface 11, during use of the arrangement 1, with respect to an imaginary inclining line 19 of a guideway 17 exhibits an obtuse angle β externally the opening in a direction toward a fore end FE of the arrangement and seen in a direction outward from the aerodynamic surface 11 and from the launch opening 13 of the arrangement 1. For example, the arrangement 1 may be carried by an aircraft flying slow and the aircraft wing W angle of attack relative the air flow AF is large, whereas the guideway 17 is adapted with such inclination that it still inclines "with" the air flow AF for providing said additional force.

The obtuse angle β may be between 100° to 150°, preferably between 110° and 135°. For some attitudes of the aircraft, the obtuse angle β may include all angles between 95° and 180°.

Figure 4:
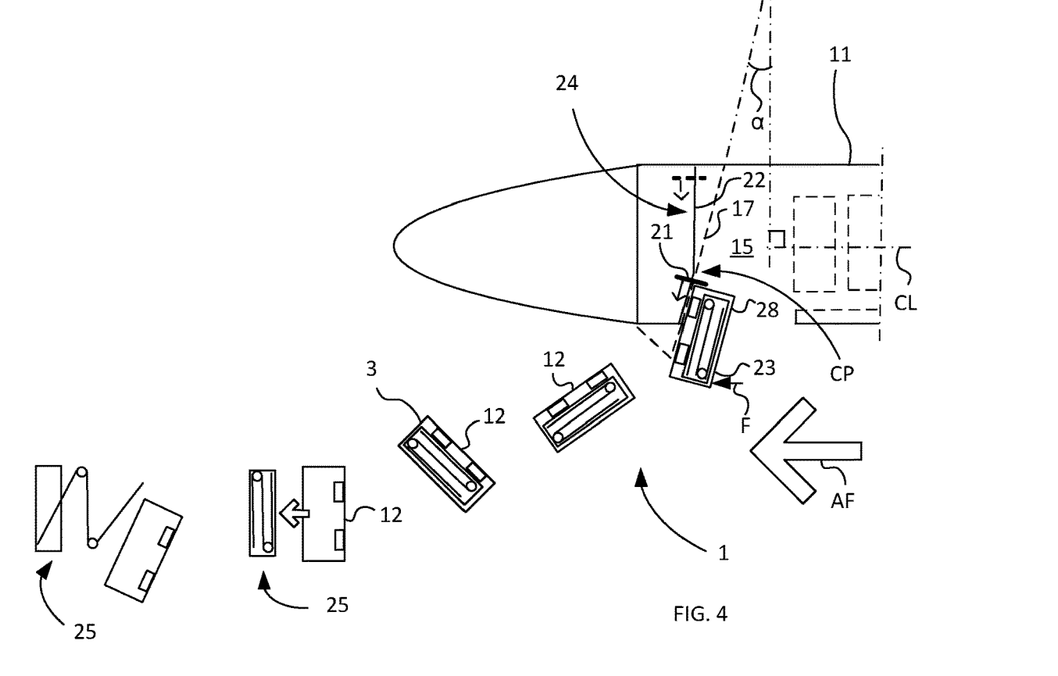
FIG. 4 illustrates an arrangement configured for storing and launching a payload according to a fourth example.

FIG. 4 illustrates an arrangement 1 configured for storing and launching a payload 3 according to a fourth example. The arrangement 1 comprises an ejection mechanism 21 configured to eject the payload 3 along the guideway 17 out from the compartment 15. The acute angle α is determined in such a way that, during use of the arrangement 1, air flow AF flowing over the aerodynamic surface 11 will apply an additional force F on a first portion 23 of the payload being ejected, so that the payload will flip around for releasing a countermeasure element by means of the airflow when the payload 3 is fully ejected from the compartment 15 and is at a distance from the aerodynamic surface 11. A second portion 28 is during a short moment sliding on the guideway 17 when the first portion 23 is exposed to the air flow AF, whereby a force generated by the air flow AF onto the first portion 23 will start said flip around or backflip. The backflip will provide that a sliding portion 12 (configured to slide on the guideway 17) will turn against the air flow AF so that the air flow AF will push out a countermeasure means 25 in an efficient way from a box-like container of the payload 3. The guideway 17 of the launch opening 13 may be coupled to or associated with a payload holding area 22 of an end section 24 of the compartment 15, which payload holding area 22 is configured to hold the payload 3 to be launched in an eject position in the compartment 15. The payload holding area 22 may be configured with an ejection mechanism 21 configured to eject the payload 3 along the payload holding area 22 in a direction toward the launch opening 13. The payload holding area 22 exhibits an extension extending transverse or substantially transverse to the centre line CL. The plane of the payload holding area 22 and the plane of the guideway 17 exhibit a relative angle corresponding to the acute angle α, which relative angle forms a corner point CP. The acute angle α may be determined such that, during use of the arrangement 1, airflow AF flowing over the aerodynamic surface 11 will apply an additional force on a first portion 23 of the payload 3 being ejected, which first portion 23 firstly leaves the payload holding area 22, thereby rotating the payload 3 over the corner point CP formed by the payload holding area 22 and the guideway 17. The acute angle α may be determined such that, during use of the arrangement 1, airflow AF flowing over the aerodynamic surface 11 will apply the additional force F on a first portion 23 of the payload 3 being ejected, so that the payload 3 will flip around for releasing a countermeasure element (not shown) by means of the airflow AF. A second portion 28 of the payload 3 may be exposed to the airflow AF after that the first portion 23 has been exposed to the airflow AF so that the payload 3 will perform a backflip (see FIG. 4) for exposing the sliding portion 12 to the airflow AF. The corner point CP may be defined as a section in which the extension of the payload holding area 22 and the guideway 17 meet. The ejection mechanism 21 configured to eject the payload 3 along the payload holding area 22 providing a motion of the payload 3 over the corner point assures that the first portion 23 is exposed to the airflow AF before the second portion 28 is exposed. The second portion 28 may be exposed to the airflow, but with less force than the additional force F.

Figure 5:
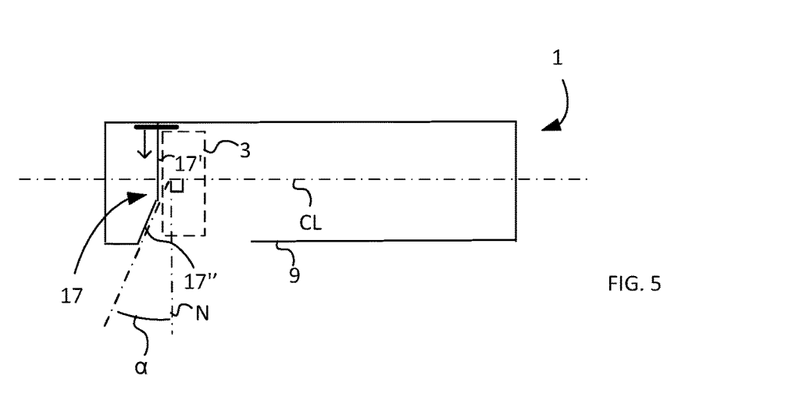
FIG. 5 illustrates an arrangement configured for storing and launching a payload according to a fifth example.

FIG. 5 illustrates an arrangement 1 configured for storing and launching a payload 3 from an elongated body 9 according to a fifth example. According to this example the guideway 17 is divided in two parts. A first part 17' exhibits an extension extending in the same direction as the normal N to the centre line CL of the elongated body 9. A second part 17" of the guideway 17 exhibits an extension that inclines with an acute angle α relative the normal N to the centre line CL of the elongated body 9. The acute angle α may be between 10° to 60°, preferably between 20° and 45°.

Figure 6:
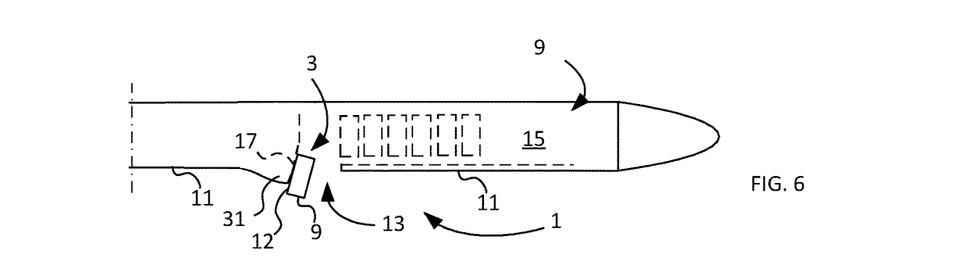
FIG. 6 illustrates an arrangement configured for storing and launching a payload according to a sixth example.

FIG. 6 illustrates an arrangement 1 configured for storing and launching a payload according to a sixth example. The arrangement 1 is configured for storing and launching a payload 3. The arrangement 1 comprises an elongated body 9 comprising a compartment 15 configured to store and eject the payload 3, an aerodynamic surface 11 of the elongated body 9 is provided with a launch opening 13 comprising a guideway 17 extending from the compartment 15. A sliding portion 12 of the payload 3 is configured to slide along the guideway 17 and through the launch opening 13 upon ejection. The extension of the guideway 17 inclines with an acute angle relative the normal to the centre line of the elongated body. The extension of the guideway 17 extends a distance outward from and beyond the major part of the aerodynamic surface 11 of the elongated body 9 by means of an extension 31. In such a way is achieved that the payload 3 will leave the elongated body 9 (the major part of the elongated body) further away from the aerodynamic surface 11 implying that the payload 3 can be ejected even further sideways from the elongated body 9. In such way is achieved an increased bloom rate when ejecting a plurality of payloads 3 from the elongated body 9.

Figure 7A:
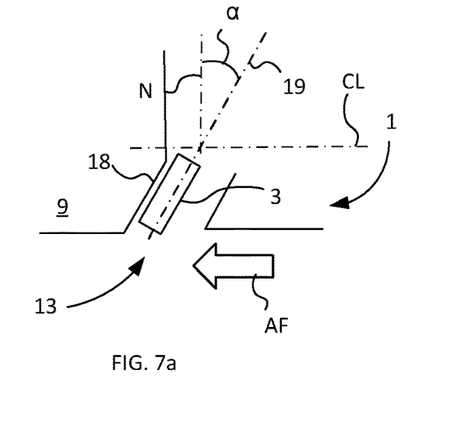
FIGS. 7a-7d illustrate an arrangement configured for storing and launching a payload according to an eight example.
Figure 7B:
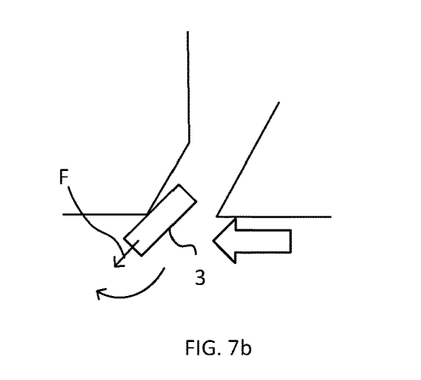
Figure 7C:
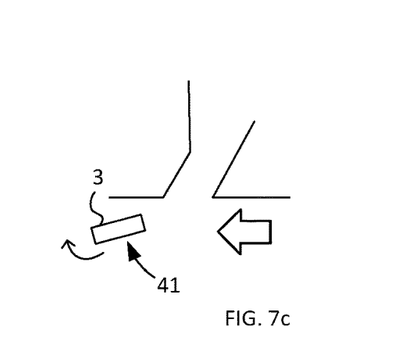
Figure 7D:
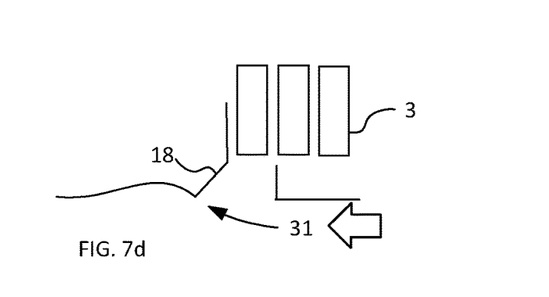

FIGS. 7a-7d illustrate an arrangement 1 according to an eight example, which arrangement 1 is configured for storing and launching a payload 3 comprising a box-like container 41 encompassing a countermeasure means (not shown). In FIG. 7a is shown that the payload to be launched is in eject position. The arrangement 1 comprises a narrow chute way 18, the extension 31 of which extends towards the launch opening 13 and exhibits an inclination corresponding with an imaginary inclining line 19 that inclines with an acute angle α relative the normal N to the centre line CL of the elongated body 9. The acute angle α may be between 10° to 60°, preferably between 20° and 45°. In FIG. 7b is shown that due to the inclination and interaction with the air flow AF, the payload 3 is further affected by an eject force pushing the payload 3 out from the launch opening 13. This additional force F is thus generated by the air flow AF in cooperation with the inclination. In FIG. 7c is shown that the payload 3 by the achieved moment of inertia and rotation energy proceed to make a backflip needed for releasing a countermeasure means from the box-like container 41.

Figures 8A, 8B:
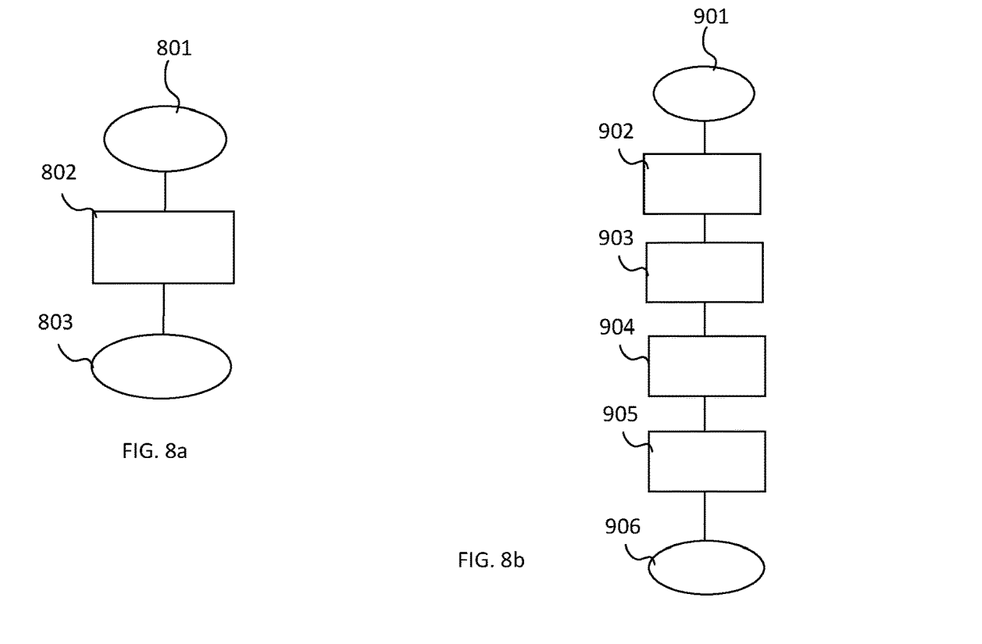
FIGS. 8a-8b illustrate alternative flowcharts showing exemplary methods for launching a payload.

FIGS. 8a-8b illustrate alternative flowcharts showing exemplary methods for launching a payload. FIG. 8a illustrate an example of a method for launching the payload from an arrangement comprising an elongated body comprising a compartment configured to store and eject the payload, an aerodynamic surface of the elongated body is provided with a launch opening comprising a guideway extending from the compartment, a sliding portion of the payload is configured to slide along the guideway and through the launch opening upon ejection, the extension of the guideway inclines with an acute angle relative the normal to the centre line of the elongated body. The method starts with step 801. In a second step 802 the method is performed. In a third step 803 the method is stopped.

The step 802 may comprise the steps of; positioning the payload to be launched in an eject position; ejecting the payload along the extension of the guideway; exposing the payload to an airflow flowing over the aerodynamic surface; and releasing a countermeasure means from the payload.

FIG. 8b illustrate another example of a method for launching the payload from an arrangement comprising an elongated body comprising a compartment configured to store and eject the payload. The exemplary method starts with step 901. A second step 902 comprises exposing a first portion of the payload to the airflow. A third step 903 comprises exposing a second portion of the payload to the airflow, the second portion being exposed after that the first portion has been exposed so that the payload will perform a backflip exposing a third portion to the airflow. A fourth step 904 may comprise ejecting the payload along the extension of the guideway extending beyond the aerodynamic surface. A fifth step 905 may comprise ejecting the payload along the extension of the guideway, wherein the extension of the guideway inclines with an acute angle relative the normal to the centre line of the elongated body, wherein the acute angle is between 10° to 60°, preferably between 20° and 45°. In a sixth step 906 the method is stopped.

The present invention is of course not in any way restricted to the examples described above, but many possibilities to modifications, or combinations of the examples, thereof should be apparent to a person with ordinary skill in the art without departing from the basic idea of the invention as defined in the appended claims.

The invention claimed is:

1. An arrangement (1) configured for storing and launching a payload (3) to be launched from the arrangement (1), the arrangement (1) comprising:
    an elongated body (9) comprising:
        a compartment (15) configured to store and eject the payload (3), and
        an aerodynamic surface (11) provided with a launch opening (13) comprising a guideway (17) extending from the compartment (15) obliquely downwards and backwards relative to a flight travel direction (D) of the payload (3), the guideway (17) being coupled to or associated with a payload holding area (22) of an end section (24) of the compartment (15), the payload holding area (22) being configured to hold the payload (3) to be launched in an eject position (EJ) stored in the compartment (15),
    wherein:
        a sliding portion (12) of the payload (3) is configured to slide along the guideway (17) and through the launch opening (13) upon ejection,
        an extension of the guideway (17) inclines with an acute angle (a) relative the normal (N) to the centre line (CL) of the elongated body (9), the acute angle (a) being inclined backwards relative to the flight travel direction (D),
        the plane of the payload area (22) and the plane of the guideway (17) exhibit a relative angle corresponding to the acute angle (α), which relative angle forms a corner point (CP),
        the payload holding area (22) has an ejection mechanism (21) configured to eject the payload (3) along the payload holding area (22) in a direction toward the launch opening (13) for providing a motion of the payload (3) over the corner point (CP), such that a first portion (23) of the payload (3) is exposed to an airflow (AF) created by travel in the flight travel direction (D) before a second portion (28) of the payload (3) is exposed to the airflow,
        the sliding portion (12) is opposite an opposite side of the payload (3) comprising the first portion (23) and the second portion (28),
        the acute angle (α) is such that, during use of the arrangement, airflow flowing over the aerodynamic surface applies an eject force on the first portion of the payload being ejected and the second portion (28) of the payload (3) is exposed to the airflow after the first portion has been exposed thereto, such that the payload will flip around for releasing a countermeasure element (25) from the payload (3) by means of the airflow;
        the aerodynamic surface (11) lies wholly in a first plane; and
        the extension of the guideway (17) intersects and continues obliquely downwards and backwards beyond the first plane with an incline oriented at the acute angle (α).

2. The arrangement (1) according to claim 1, wherein a gradient of the direction of the airflow (AF) flowing over the aerodynamic surface (11), during use of the arrangement (1), with respect to the incline of the extension of the guideway (17) exhibits an obtuse angle ((3) defined externally the launch opening (13) in a direction toward a fore end (FE) of the arrangement (1) and seen in a direction outward from the aerodynamic surface (11).

3. The arrangement (1) according to claim 1, wherein the extension of the guideway (17) extends a distance outward from and beyond a major part of the aerodynamic surface (11).

4. The arrangement (1) according to claim 1, wherein the acute angle (α) is between 10° to 60°.

5. An aerial vehicle (5) configured to carry the arrangement (1) according to claim 1.

6. A method for launching a payload (3) from an arrangement (1), the method comprising the steps of:
    providing the arrangement (1) comprising an elongated body (9) comprising:

a compartment (15) configured to store and eject the payload (3) that is to be launched from the arrangement (1), and an aerodynamic surface (11) provided with a launch opening (13) comprising a guideway (17) extending from the compartment (15) obliquely downwards and backwards relative to a flight travel direction (D) of the payload (3), the guideway (17) being coupled to or associated with a payload holding area (22) of an end section (24) of the compartment (15), the payload holding area (22) being configured to hold the payload (3) to be launched in an eject position (EJ) stored in the compartment (15), wherein:
- a sliding portion (12) of the payload (3) is configured to slide along the guideway (17) and through the launch opening (13) upon ejection,
- an extension of the guideway (17) inclines with an acute angle (α) relative the normal (N) to the centre line (CL) of the elongated body (9), the acute angle (α) being inclined backwards relative to the flight travel direction (D),
- a plane of the payload area (22) and a plane of the guideway (17) exhibit a relative angle corresponding to the acute angle (α), which relative angle forms a corner point (CP),
- the payload holding area (22) has an ejection mechanism (21) configured to eject the payload (3) along the payload holding area (22) in a direction toward the launch opening (13) for providing a motion of the payload (3) over the corner point (CP), such that a first portion (23) of the payload (3) is exposed to an airflow (AF) created by travel in the flight travel direction (D) before a second portion (28) of the payload (3) is exposed to the airflow,
- the sliding portion (12) is opposite an opposite side of the payload (3) comprising the first portion (23) and the second portion (28),
- the acute angle (α) is such that, during use of the arrangement, an airflow (AF) flowing over the aerodynamic surface applies an eject force on the first portion of the payload being ejected,
- the aerodynamic surface (11) lies wholly in a first plane, and
- the extension of the guideway (17) intersects and continues obliquely downwards and backwards beyond the first plane with an incline oriented at the acute angle (α), positioning the payload (3) to be launched in the eject position (EJ);

ejecting the payload (3) along the extension of the guideway (17) and at the acute angle (α) inclined backwards relative to the flight travel direction (D) and with the airflow (AF) flowing over the aerodynamic surface;

exposing the payload (3) to the airflow (AF) flowing over the aerodynamic surface (11), such that the eject force applied, via the airflow (AF) in the same direction as ejection, on the first portion of the payload being ejected will cause the payload to flip around before the second portion of the payload (3) is exposed to the airflow; and upon flipping around of the payload, releasing a countermeasure means (25) from the payload by means of the airflow (AF).

7. The method according to claim 6, the method comprises the step of:

ejecting the payload (3) along the extension of the guideway (17), wherein the acute angle (α) is between 10° to 60°.

8. The method according to claim 7, wherein the acute angle is between 20° to 45°.

9. The arrangement (1) according to claim 1, wherein the acute angle is between 20° to 45°.

* * * * *

UNITED STATES PATENT AND TRADEMARK OFFICE
CERTIFICATE OF CORRECTION

PATENT NO. : 11,999,483 B2
APPLICATION NO. : 17/250527
DATED : June 4, 2024
INVENTOR(S) : Gunnar Bystroem et al.

It is certified that error appears in the above-identified patent and that said Letters Patent is hereby corrected as shown below:

In the Claims

In Column 10, Line 13, Claim 1, delete "(a)" and insert -- ($\alpha$) --, therefor.

In Column 10, Line 15, Claim 1, delete "(a)" and insert -- ($\alpha$) --, therefor.

In Column 10, Line 17, Claim 1, delete "payload area (22)" and insert -- payload holding area (22) --, therefor.

In Column 10, Line 52, Claim 2, delete "((3)" and insert -- ($\beta$) --, therefor.

In Column 11, Line 23, Claim 6, delete "payload area (22)" and insert -- payload holding area (22) --, therefor.

Signed and Sealed this
Twenty-fourth Day of September, 2024

Katherine Kelly Vidal
*Director of the United States Patent and Trademark Office*